(12) United States Patent
Costa et al.

(10) Patent No.: US 12,406,803 B2
(45) Date of Patent: Sep. 2, 2025

(54) METHOD FOR THE PRODUCTION OF SHEET CORES, GRIPPING SYSTEM FOR STACKS OF SHEETS AND PLANT FOR THE PRODUCTION OF SHEET CORES

(71) Applicant: L.A.E. LUGHESE ATTREZZATURE PER L'ELETTROMECCANICA S.R.L., Lugo (IT)

(72) Inventors: Damiano Costa, Lugo (IT); Riccardo Bedeschi, Lugo (IT)

(73) Assignee: L.A.E. LUGHESE ATTREZZATURE PER L'ELETTROMECCANICA S.R.L. (IT)

( * ) Notice: Subject to any disclaimer, the term of this patent is extended or adjusted under 35 U.S.C. 154(b) by 472 days.

(21) Appl. No.: 17/800,249

(22) PCT Filed: Feb. 25, 2021

(86) PCT No.: PCT/IB2021/051577
§ 371 (c)(1),
(2) Date: Aug. 17, 2022

(87) PCT Pub. No.: WO2021/171217
PCT Pub. Date: Sep. 2, 2021

(65) Prior Publication Data
US 2023/0063429 A1     Mar. 2, 2023

(30) Foreign Application Priority Data
Feb. 25, 2020    (IT) .................. 102020000003880

(51) Int. Cl.
H01F 7/06         (2006.01)
B65G 47/92        (2006.01)
H01F 41/02        (2006.01)

(52) U.S. Cl.
CPC ......... H01F 41/0233 (2013.01); B65G 47/92 (2013.01)

(58) Field of Classification Search
CPC ...................... H01F 41/0233; B65G 47/92
See application file for complete search history.

(56) References Cited

U.S. PATENT DOCUMENTS 11,495,378 B2 * 11/2022 Inoue .................. H01F 41/0233

FOREIGN PATENT DOCUMENTS

| CH | 658931 A5 | 12/1986 |
|---|---|---|
| CN | 105702445 A | 6/2016 |
| CN | 108695056 A | 10/2018 |
| DE | 2845676 A1 | 4/1980 |
| SE | 414689 B | 8/1980 |

* cited by examiner

*Primary Examiner* — Paul D Kim
(74) *Attorney, Agent, or Firm* — The Belles Group, P.C.

(57) ABSTRACT

Method, gripping system and plant for the production of stacked grain oriented sheet cores for transformers by means of stacks of sheets; the method providing for providing a stack of sheets comprising one or more sheets made of grain oriented electrical steel; grabbing said stack of sheets by means of a gripping system; placing the stack of sheets on an assembly table; during the step of placing, the stack of sheets falling in free fall along a path.

6 Claims, 9 Drawing Sheets

METHOD FOR THE PRODUCTION OF SHEET CORES, GRIPPING SYSTEM FOR STACKS OF SHEETS AND PLANT FOR THE PRODUCTION OF SHEET CORES

CROSS-REFERENCE TO RELATED APPLICATIONS

This patent application is a U.S. national stage application under 35 U.S.C. § 371 of PCT application no. PCT/IB2021/051577, filed on Feb. 25, 2021, which claims priority from Italian patent application no. 102020000003880 filed on Feb. 25, 2020. The entire disclosure of the aforementioned priority applications are incorporated herein by reference in their entireties.

TECHNICAL FIELD

The present patent application relates to a method for the production of sheet cores, to a gripping system for stacks of sheets and a plant for the production of sheet cores, in particular of the type with grain oriented sheets.

BACKGROUND ART

Sheet cores having grain oriented sheets are applied, for example, to the manufacturing of electrical energy transmission and distribution transformers, i.e. for transformers of power greater than 10 kVA.

Generally, sheet cores having grain oriented sheets comprise: a lower yoke, an upper yoke and a plurality of columns each of which connects the lower yoke with the upper yoke.

Sheet cores having grain oriented sheets are cores of large dimensions and of considerable weights, which require suitable production plants and handling equipment. It should be noted for example that, for the distribution or power applications, the columns of the cores can have lengths comprised from 0.5 to 5 meters.

For the manufacturing of sheet cores, it is known to produce and stack a plurality of sheets made of grain oriented electrical steel by means of a process which essentially entails three steps:
  providing a plurality of strips made of grain oriented electrical steel, having different widths;
  cutting the strips in different lengths, so as to obtain a plurality of metal sheets having different widths and/or lengths;
  assembling the metal sheets, so as to form the core by manufacturing stacks of sheets, each of which corresponds to a yoke or to a column.

The material generally used for the manufacturing of the sheet cores, i.e. the grain oriented electrical steel, is a material thick enough that it cannot be bent excessively otherwise it can cause the degradation of the silicon component. Therefore, the sheet cores are manufactured by combining and overlapping a plurality of flat sheets, which are never subjected to bending.

Above all, particular attention is paid to handling the sheets, so as to ensure the coplanarity and prevent the formation of undesired creases or indentations thereof.

Downstream of the cutting station of the sheets from the steel strip, it is known to automatically form stacks of sheets. Such stacks of sheets can be formed by a variable number of sheets depending on the project.

For example, a stack of sheets can be formed by the overlapping of ten sheets.

Each stack of sheets is then grabbed and transported, manually or by means of a gripping system, on an assembly table where it is combined with other stacks of sheets so as to form a core. Generally, the assembly table is horizontal, i.e. is parallel to a horizontal support plane. Usually, an assembly table has reference pins, each of which protrudes vertically from the assembly table in a respective predefined position.

Generally, each sheet has holes in predefined positions. Each stack of sheets thus has one or more slots formed by the joining of respective holes of all the overlapped sheets and which form the stack of sheets.

In order to place the stack of sheets on the assembly table, it is necessary for each pin of the assembly table to pass through a respective slot of the stack of sheets.

Therefore, during the transfer and the combination of the stacks of sheets on the assembly table it is necessary to ensure the alignment of the sheets forming a stack of sheets, in order to prevent undesired jams or deformations of the sheets during the sliding on respective pins.

Usually, the transfer and positioning (with centring and insertion on the pins) operations of the stacks of sheets are carried out manually by operators.

However, this has the drawback of having to provide for high processing times and dedicated operators for the operations of transfer of the stacks of sheets and of production of the core.

The use of automated gripping systems for moving and producing the stacks of sheets is also known.

However, the gripping systems of known type have the drawback of being particularly rigid and thus unable to compensate for any misalignments between a pin and the holes of the sheets. This entails jams and the possible damaging of the sheets, with consequent slowdowns in the production and higher costs (due to the rejection and replacement of the damaged sheets).

DISCLOSURE OF INVENTION

The object of the present invention is to provide a gripping system which allows overcoming the above-described drawbacks. In particular, the object of the present invention is to provide a gripping system which allows producing a core correctly, in an automatic manner without jams or interruptions.

According to the present invention, a method is provided for the production of a sheet core according to what claimed in the appended claims.

According to the present invention, a gripping system is provided according to what claimed in the appended claims.

According to the present invention, a plant is provided for the production of sheet cores for transformers according to what claimed in the appended claims.

BRIEF DESCRIPTION OF THE DRAWINGS

The invention will now be described with reference to the accompanying drawings, which illustrate some non-limiting embodiment examples thereof, wherein.

BEST MODE FOR CARRYING OUT THE INVENTION

Figure 1A:
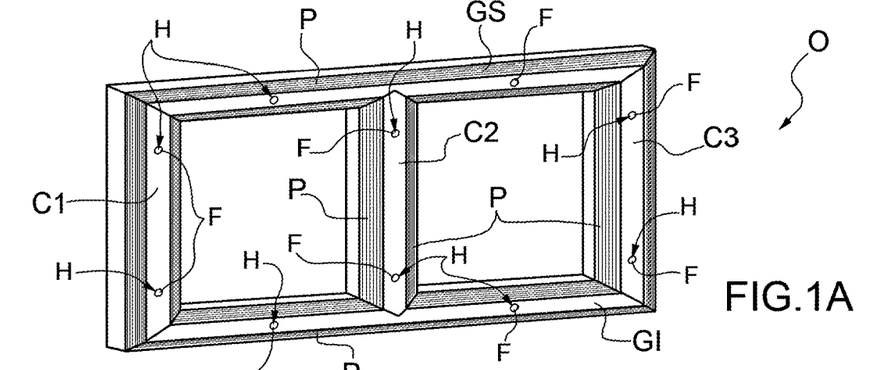
FIG. 1A is a schematic view of a stacked sheet core having grain oriented sheets for power transmission and distribution transformers.

In FIG. 1A, O indicates, as a whole, a sheet core, in particular for distribution or power transformers, i.e. for electrical energy transmission and distribution transformers, i.e. for transformers of power greater than 10 kVA. The core O comprises, in a known manner, a lower yoke GI and an upper yoke GS transversely connected to each other by a plurality of columns C. According to the illustrated example, the columns are three: two lateral ones indicated with C1 and C3 and a central one indicated with C2. Each yoke GI, GS is connected to respective ends of each column C1, C2 and C3.

Each yoke GI, GS and each column C1, C2, C3 are composed by means of the overlapping of a plurality of grain oriented sheets P. The sheets P are generally made of grain oriented electrical steel. Advantageously, the sheets P are obtained starting from a single strip B, which is suitably processed (for example punched and/or cut).

The connection between each yoke GI, GS and each column C1, C2 and C3 is made by means of a shaped joint, in particular a herringbone joint.

Figure 1B:
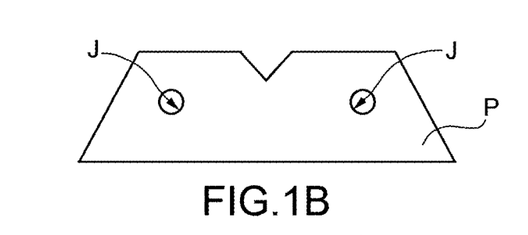
FIG. 1B schematically illustrates an example of a grain oriented sheet according to the present invention.

According to the example illustrated in FIG. 1B, the sheets P can have holes J arranged in predefined positions. In this case, as illustrated in FIG. 1A, the core O obtained with such types of sheets P has slots H, each of which is configured to house, in use, a respective structural stud F.

In a known manner, each slot H is formed by the joining of the holes J aligned with each other of respective overlapped sheets P. According to a variant not illustrated, the sheets P are devoid of holes J; in this case, the core O is devoid of the slots H.

Figure 2:
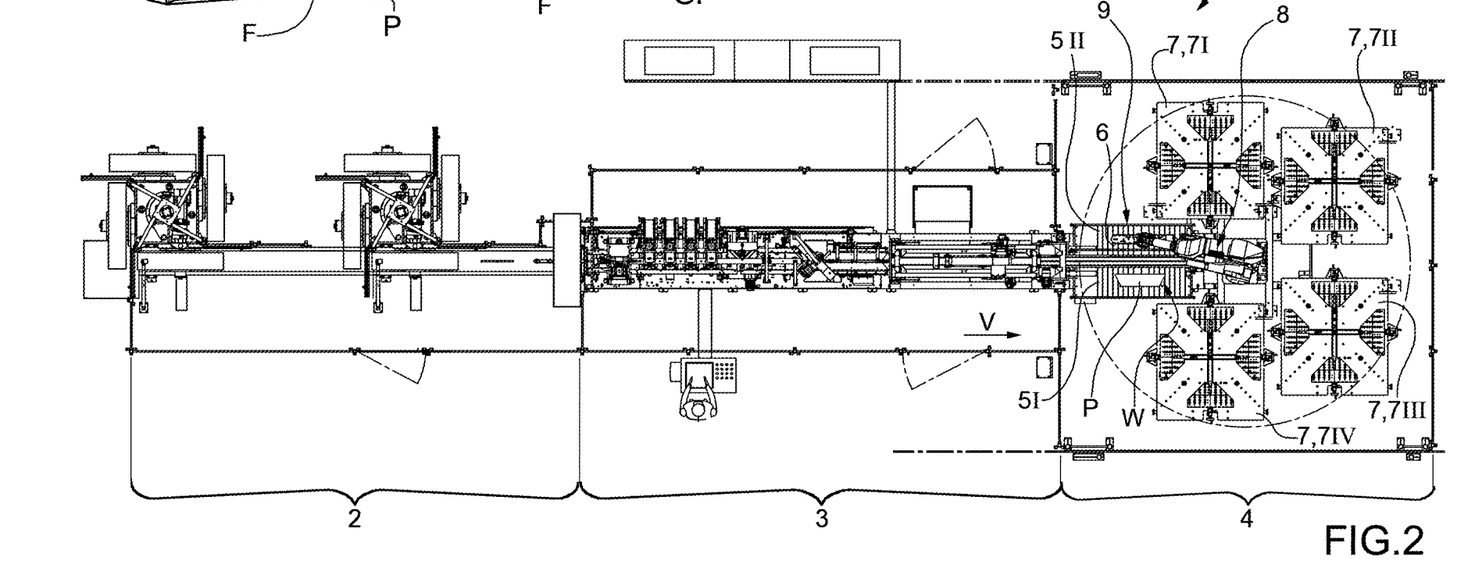
FIG. 2 is a plan view of a plant according to the present invention.

The plant 1 comprises a feeding system 2, configured to feed at least one strip B of ferromagnetic metal material, in particular made of grain oriented electrical steel. Preferably, the feeding system 2 of the plant 1 is like that of the type illustrated in the international patent application WO 2018/220585 A1, the teachings of which are to be understood integrated herein by reference. In particular, the feeding system 2 is configured to feed a plurality of strips B in parallel, so as to eliminate the downtimes for changing the size of the strip.

The plant 1 also comprises, in a known manner and schematically illustrated, a processing unit 3 which in turn has one or more punching and/or cutting stations α along which, for example, the holes J are made (if provided) and further processes for providing each sheet P with a predetermined shape and for separating each sheet P from the strip B.

The plant 1 also comprises a stacking unit 4 arranged downstream, with respect to the direction of advancement v of the sheets P, of the processing unit 3.

At the stacking unit 4, a plurality of sheets P are stacked on a respective loading plane 5, so as to form a stack of sheets W.

Generally, a stack of sheets W comprises about ten overlapped sheets P. Without losing generality, the number of sheets P of a stack of sheets W can be different and, possibly, a stack of sheets W can also be formed by a single sheet P.

Advantageously, the stacking unit 4 comprises an assembly unit 6, which is configured to move each stack of sheets W from the respective loading plane 5 onto an assembly table 7. In particular, the assembly unit 6 is configured to position each stack of sheets W on the assembly table 7 according to a predefined order.

In particular, the assembly unit 6 is configured to form the yokes GI, GS and the columns C1, C2 and C3 on the assembly table 7 so as to form a core O.

According to the example illustrated in FIG. 2, the stacking unit 4 comprises two loading planes 5I, 5II parallel to each other. According to a variant not illustrated, the plant 1 can comprise a number of loading planes 5 different from those illustrated. For example, a plant 1 can comprise a single loading plane 5 or three or more loading planes 5. Advantageously, the presence of a plurality of loading planes 5I, 5II in parallel allows ensuring production continuity and eliminating (or significantly reducing) the waiting times of an assembly unit 6 during the formation of a stack of sheets W. In this manner, advantageously, a stack of sheets W can be formed while the assembly unit 6 grabs and positions another stack of sheets W already formed.

Each loading plane 5I, 5II is configured to receive by fall single sheets P exiting the processing unit 3, so as to form respective stacks of sheets W (schematically illustrated in FIGS. 10 to 18).

According to the example illustrated in FIG. 2, the plant 1 comprises an assembly unit 6 and four assembly tables 7 (in FIG. 2 and hereinafter the assembly tables 7 are identified by Roman numerals I-IV), which are evenly distributed around the assembly unit 6. In this manner, a single assembly unit 6 is able to simultaneously form a plurality of cores O, each on a respective assembly table 7. Alternatively, the plant 1 can comprise a number of assembly units 6 and of assembly tables 7 different from the one illustrated.

Figure 19:
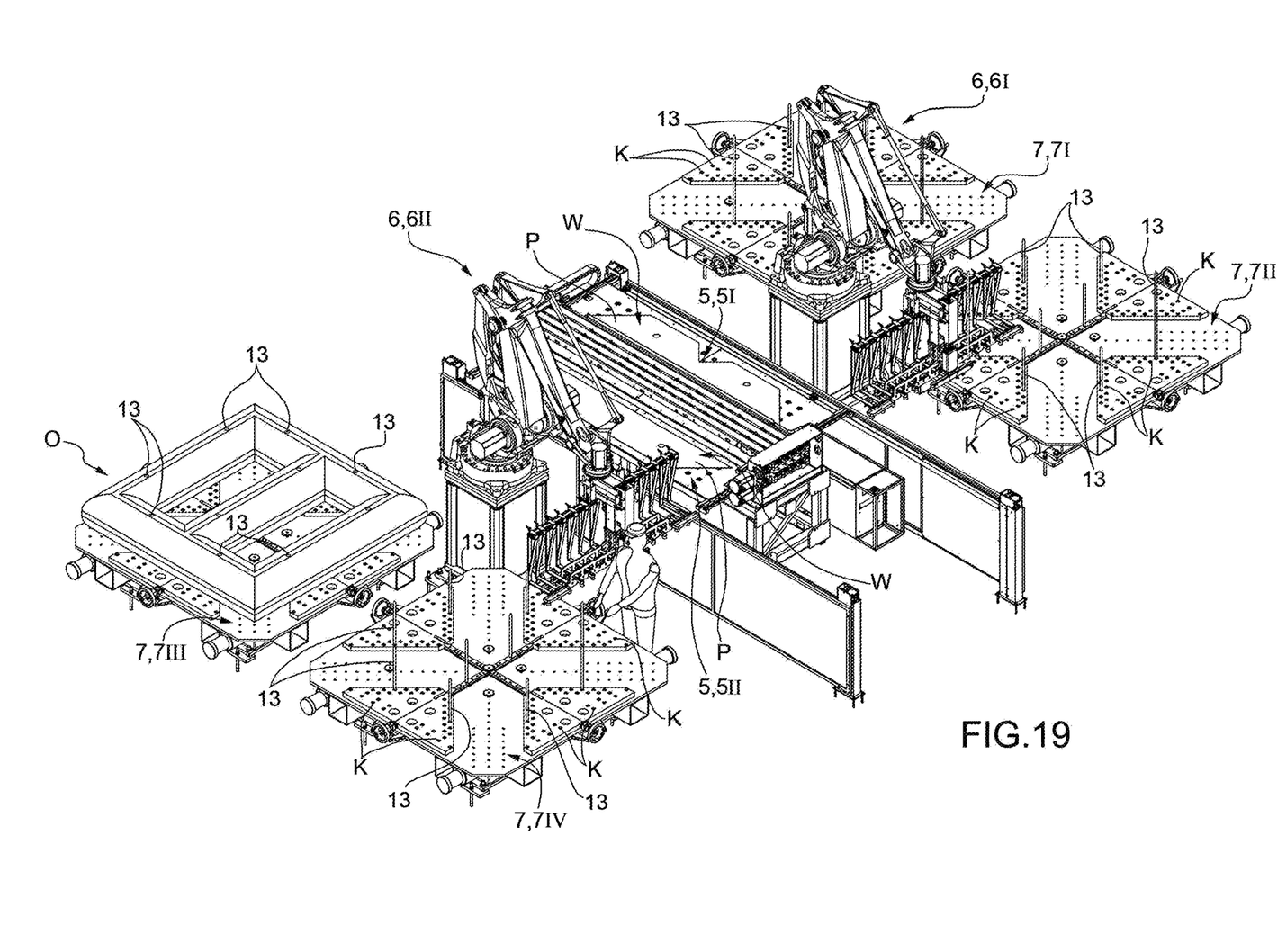
FIG. 19 illustrates a variant of a plant according to the present invention.

Without losing generality, for illustrative purposes only, according to the variant illustrated in FIG. 19, the plant 1 comprises two assembly units 6 in parallel with each other, each assembly unit 6 is configured to grab a stack of sheets W from any loading plane 5I or 5II of the feeding system 2. According to what illustrated in FIG. 19, each assembly unit 6I, 6II is configured to feed a stack of sheets W to any assembly table 7 among a plurality of assembly tables 7I-7IV. According to the example illustrated in FIG. 19, the assembly tables 7I-7IV are four, two for each assembly unit 6. According to a variant not illustrated, the number of assembly tables 7 can be different.

Each assembly table 7 is horizontal, i.e. is parallel to a horizontal support plane. In case the core O to be manufactured has slots H, the respective assembly table 7 has reference pins 13 (illustrated in detail in FIGS. 15 to 19) which are vertical and, in order to place a stack of sheets W onto the assembly table 7 it is necessary for respective reference pins 13 to pass through the slots H (it should be noted that, if present, the slots H are generally two for each stack of sheets W) of the stack of sheets W. The assembly tables 7 have, in a known manner, a plurality of housings k, each of which is configured to house a respective reference pin 13. Depending on the type of core O to be manufactured, the reference pins 13 are installed in respective predefined housings k. This operation is generally carried out manually by an operator during a step of preparation of the assembly table 7. Advantageously, the presence of a plurality of assembly tables 7 in parallel allows carrying out the steps of preparation (i.e. the providing of the reference pins 13 on an assembly table 7) in masked time.

Advantageously, the assembly unit 6 comprises a transport system 8 and a gripping system 9. The transport system 8 is configured to move the gripping system 9 in space according to predefined trajectories.

According to the examples illustrated in FIGS. 2 and 19, the transport system 8 is an anthropomorphic robot. According to a variant not illustrated, the transport system 8 can be a Cartesian machine or an equivalent system.

Advantageously, the gripping system 9 is configured to grab a stack of sheets W from a loading plane 5 and place it onto an assembly table 7 in a predefined position. Advantageously, the gripping system 9 is configured to allow the correct alignment and positioning of the stack of sheets W. Advantageously, the gripping system 9 is configured to allow the correct sliding of the stack of sheets W on respective reference pins 13, if present, in this manner jams and the damaging of the sheets P are prevented.

As illustrated in greater detail in FIGS. 3 to 9, the gripping system 9 comprises, in turn, a support assembly 12, which is configured to fix the gripping system 9 to the transport system 8. The gripping system 9 also comprises an electromagnetic system 10 (illustrated in greater detail in FIGS. 5 to 7) and a support system 11 (illustrated in greater detail in FIGS. 8 and 9). As will be better illustrated in the following, the electromagnetic system 10 is configured to selectively produce an electromagnetic field E (schematized in FIGS. 11 to 14) suited to attract, in use, the entire stack of sheets W and the support system 11 is configured to support the entire stack of sheets W in abutment and facilitate the positioning of the stack of sheets W above an assembly table 7, in particular on reference pins 13 (FIGS. 15 to 18).

Figure 3:
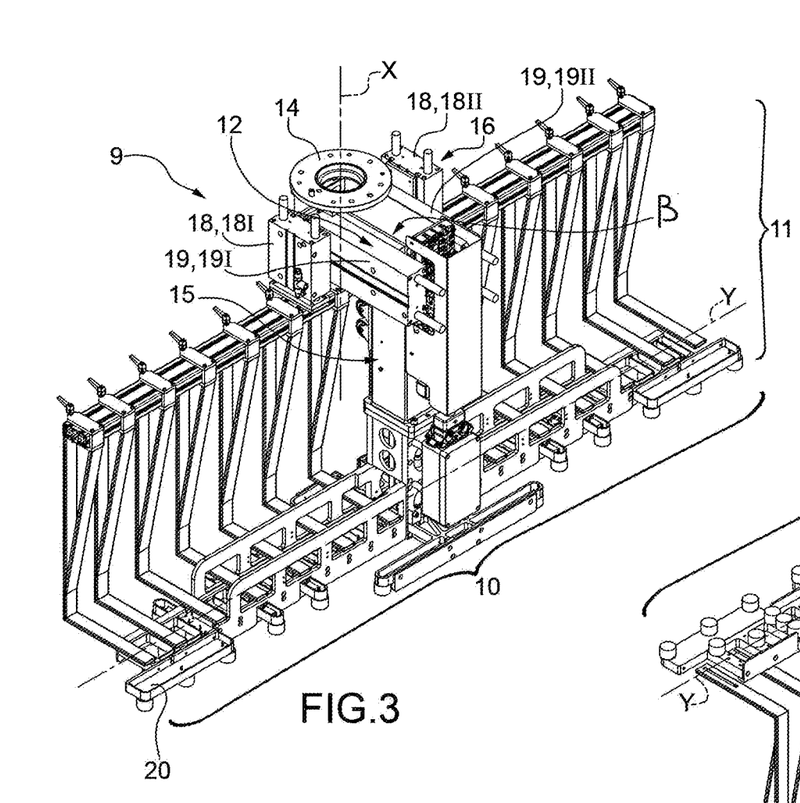
FIG. 3 is a perspective view of a gripping system according to the present invention.
Figure 4:
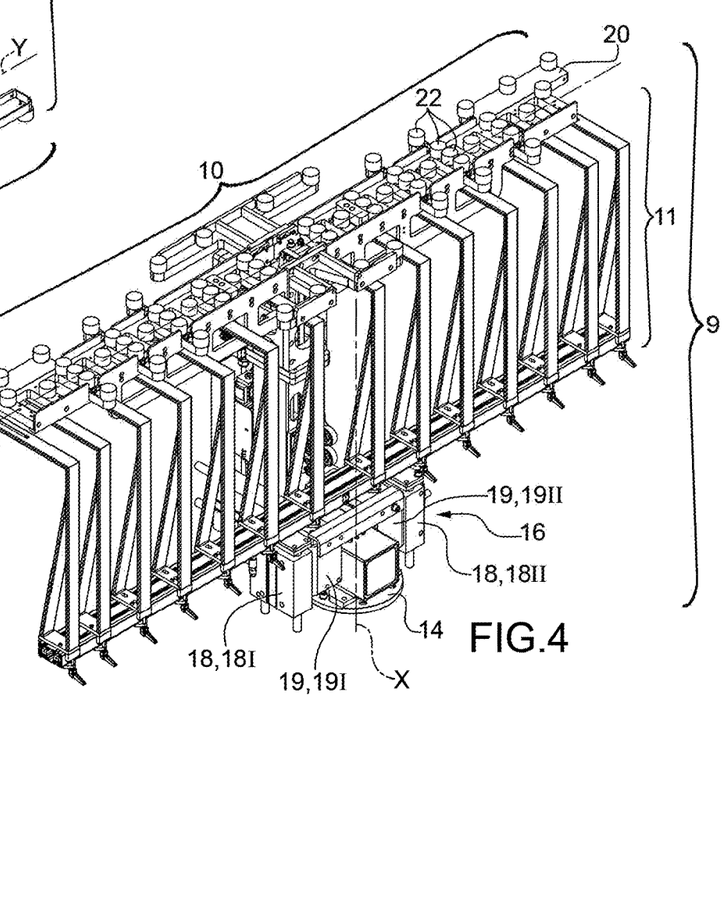
FIG. 4 is a perspective view of the gripping system of FIG. 3 overturned.

As illustrated in FIG. 3, the support assembly 12 comprises a flange 14, which has an axis of symmetry X, and a mechanical arm 15.

The flange 14 is configured to be fixed, in a known manner and not illustrated (generally by means of bolts), to a free flanged end (of a known type and not illustrated) of the transport system 8. For example, the flange 14 is configured to be fixed to a free flanged end of an anthropomorphic robot.

The mechanical arm 15 is connected with a proximal end 13 to the flange 14. The mechanical arm 15 is a rigid body and substantially parallel to the axis of symmetry X of the flange 14. The mechanical arm 15 also has a flanged distal proximity γ.

The electromagnetic system 10 is connected to the mechanical arm 15. According to the example illustrated in the figures, the electromagnetic system 10 is fixed in a predefined position with respect to the mechanical arm 15. In the example illustrated, the electromagnetic system 10 is fixed to the flanged distal end γ of the mechanical arm 15.

According to a variant not illustrated, the electromagnetic system 10 and the mechanical arm 15 are connected so as to be reciprocally movable.

Advantageously, the gripping system 9 comprises a transport assembly 16 which connects the support system 11 to the support assembly 12. According to the illustrated example, the gripping system 9 comprises a drive assembly 16 which is configured to move the support system 11 with respect to the mechanical arm 15.

According to the example illustrated in the figures, the drive assembly 16 comprises a vertical drive unit 18 and a horizontal drive unit 19. The vertical drive unit 18 is configured to reciprocally move the mechanical arm 15 and the support system 11 along the axis of symmetry X. The horizontal drive unit 19 is configured to reciprocally move the mechanical arm 15 and the support system 11 along an axis Z. The axis Z is transverse, in particular perpendicular, to the axis of symmetry Z.

The vertical drive unit 18 comprises two cylinders parallel to each other and identified in the following as left vertical cylinder 18I and, respectively, right vertical cylinder 18II. The mechanical arm 15 is interposed between the left vertical cylinder 18I and the right vertical cylinder 18II of the vertical drive unit 18.

The horizontal drive unit 19 comprises two cylinders parallel to each other and identified in the following as left horizontal cylinder 19I and, respectively, right horizontal cylinder 19II. The mechanical arm 15 is interposed between the left horizontal cylinder 19I and the right horizontal cylinder 19II of the horizontal drive unit 19.

Advantageously, the central position of the mechanical arm 15 with respect both to the vertical drive unit 18 and to the horizontal drive unit 19 ensures stiffness and stability of the gripping system 9 (in this regard, the dimensions and the high weights that can be reached by a pack of sheets W are recalled).

Figure 5:
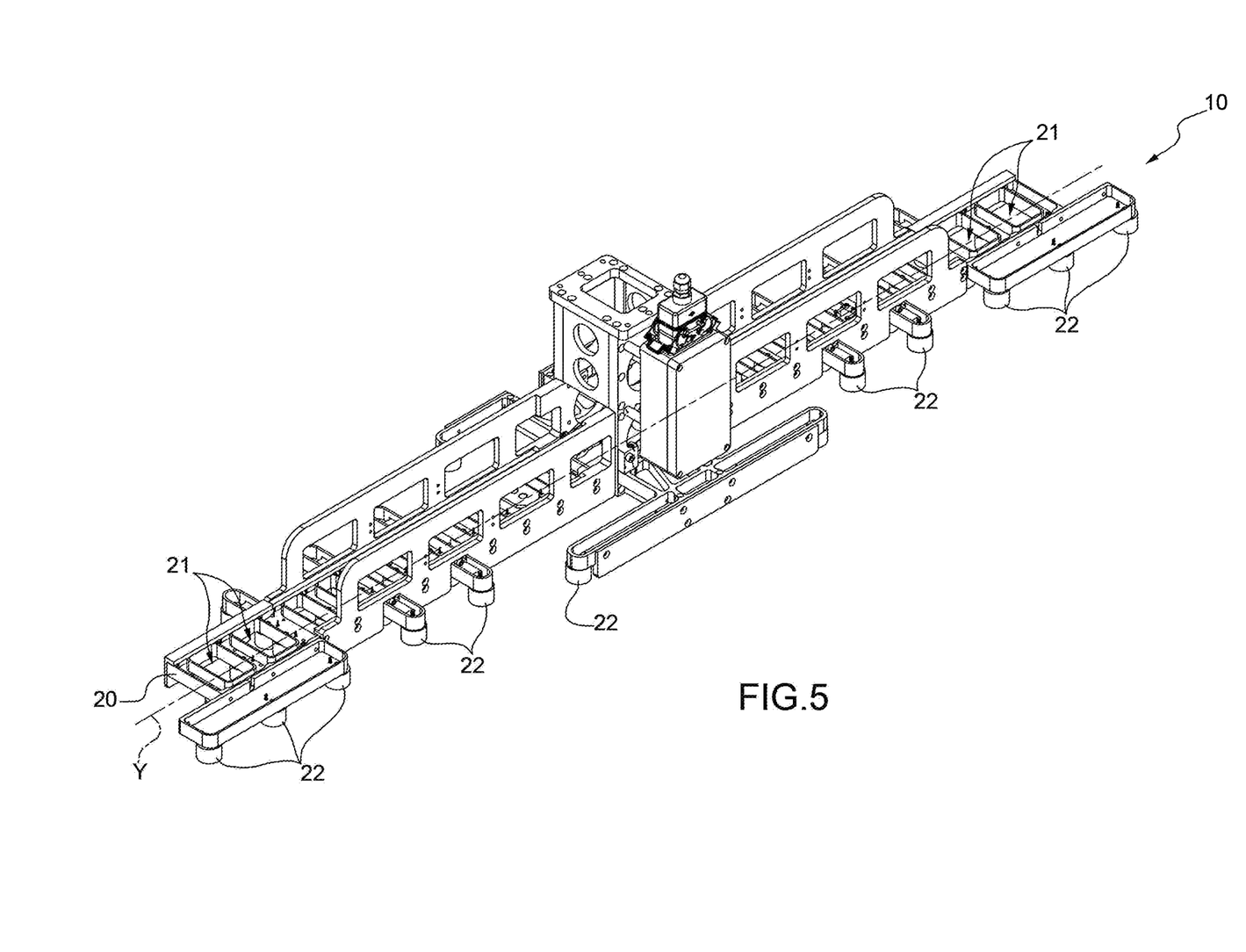
FIG. 5 is a perspective view of a detail of a gripping system according to the present invention.
Figure 6:
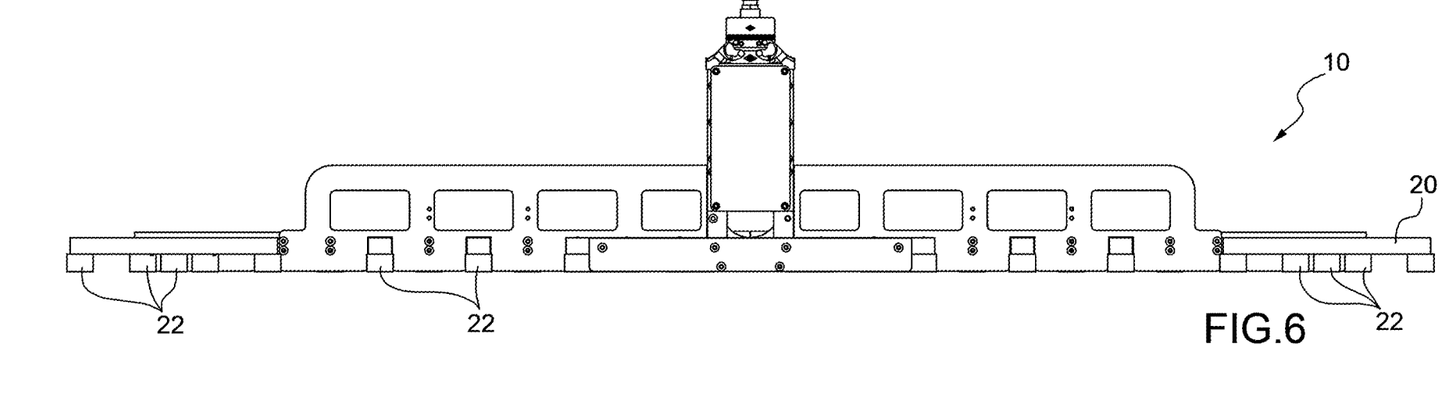
FIGS. 6 and 7 are a side view and, respectively, a bottom view of the detail of FIG. 5.
Figure 7:
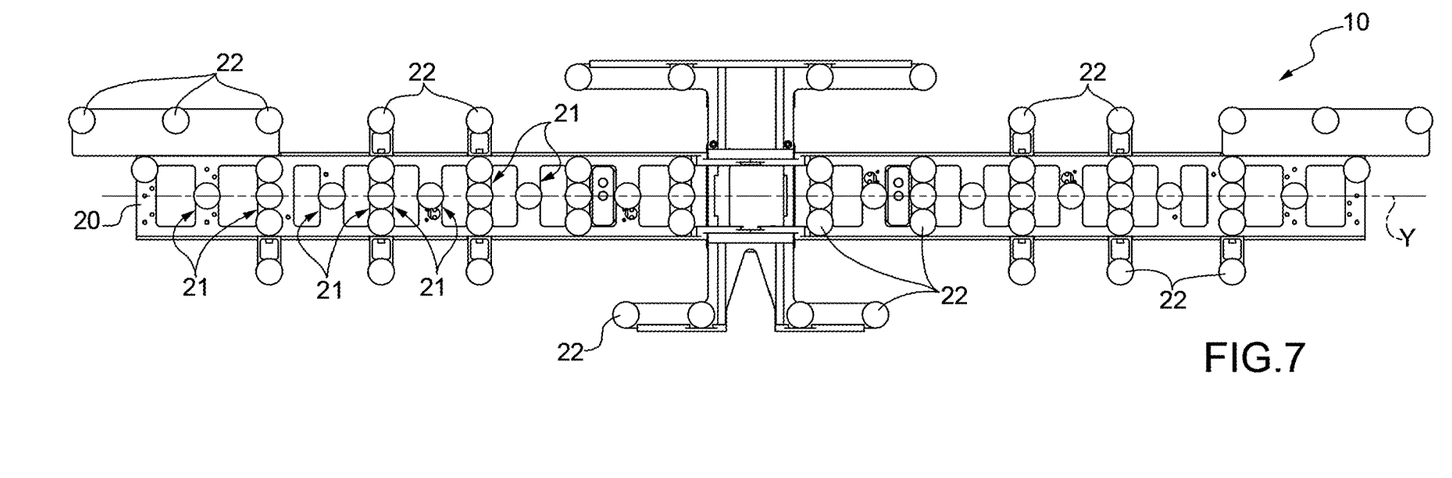
Figure 10:
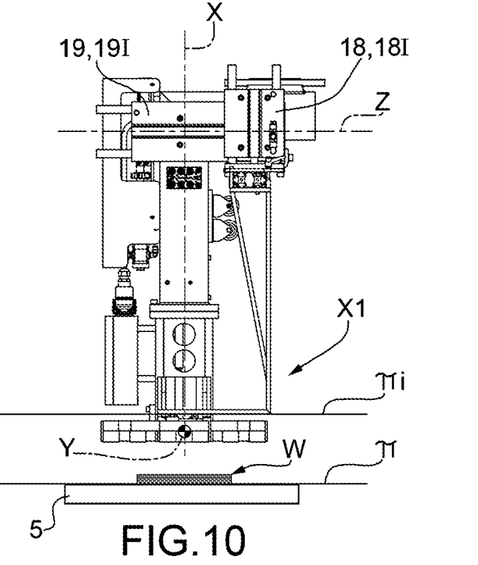
FIGS. 10 to 18 illustrate a gripping system according to the present invention in respective different operating configurations.
Figure 11:
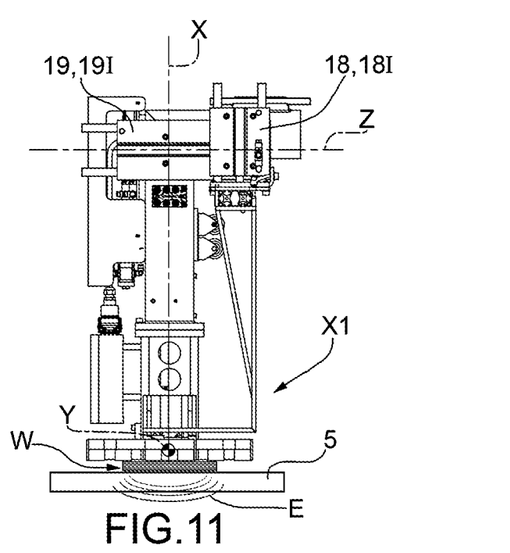
Figure 12:
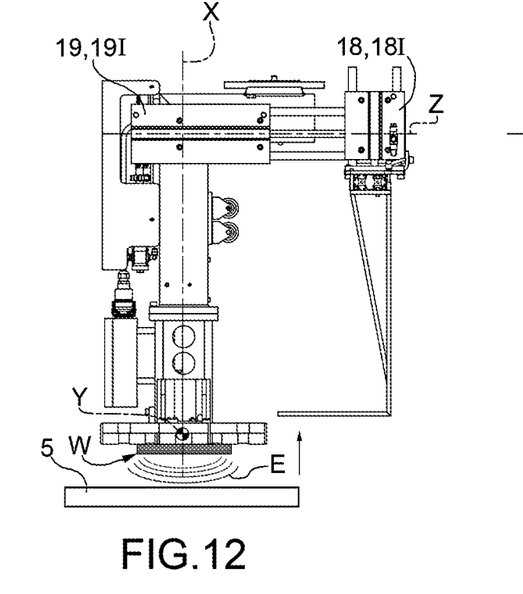

According to what illustrated in FIGS. 5 to 7, the electromagnetic system 10 comprises a support 20 having a longitudinal axis Y substantially transverse to the longitudinal axis X of the mechanical arm 15. The support 20 is configured to be able to adhere in one or more points to a flat surface, in particular lying on a horizontal plane π, such as for example a loading plane 5 or an assembly table 7 (FIG. 10). The support 20 has a plurality of windows 21 which are distributed along the longitudinal axis Y. The shape and/or size and/or position along the axis Y of each window 21 depends on the type of assembly table 7 whereon the gripping system 9 has to arrange the stack of sheets W. In particular, each window 21 is configured to be able to house, in use, a reference pin 13 which protrudes from a relative housing k of the assembly table 7.

The electromagnetic system 10 also comprises a plurality of electromagnets 22, each of which is fixed to the support 20 so as to face, in use, the stack of sheets W. Each electromagnet 22 is configured to be activated or disconnected electrically, so as to selectively produce an electromagnetic field E capable of attracting a stack of sheets W. When an electromagnet 22 is electrically activated it generates an electromagnetic field E. When an electromagnet 22 is disconnected the electromagnetic field E ceases. The number and the arrangement of the electromagnets 22 depends on the shape and dimension of the type of stacks of sheets W to be handled.

Figures 8, 9:
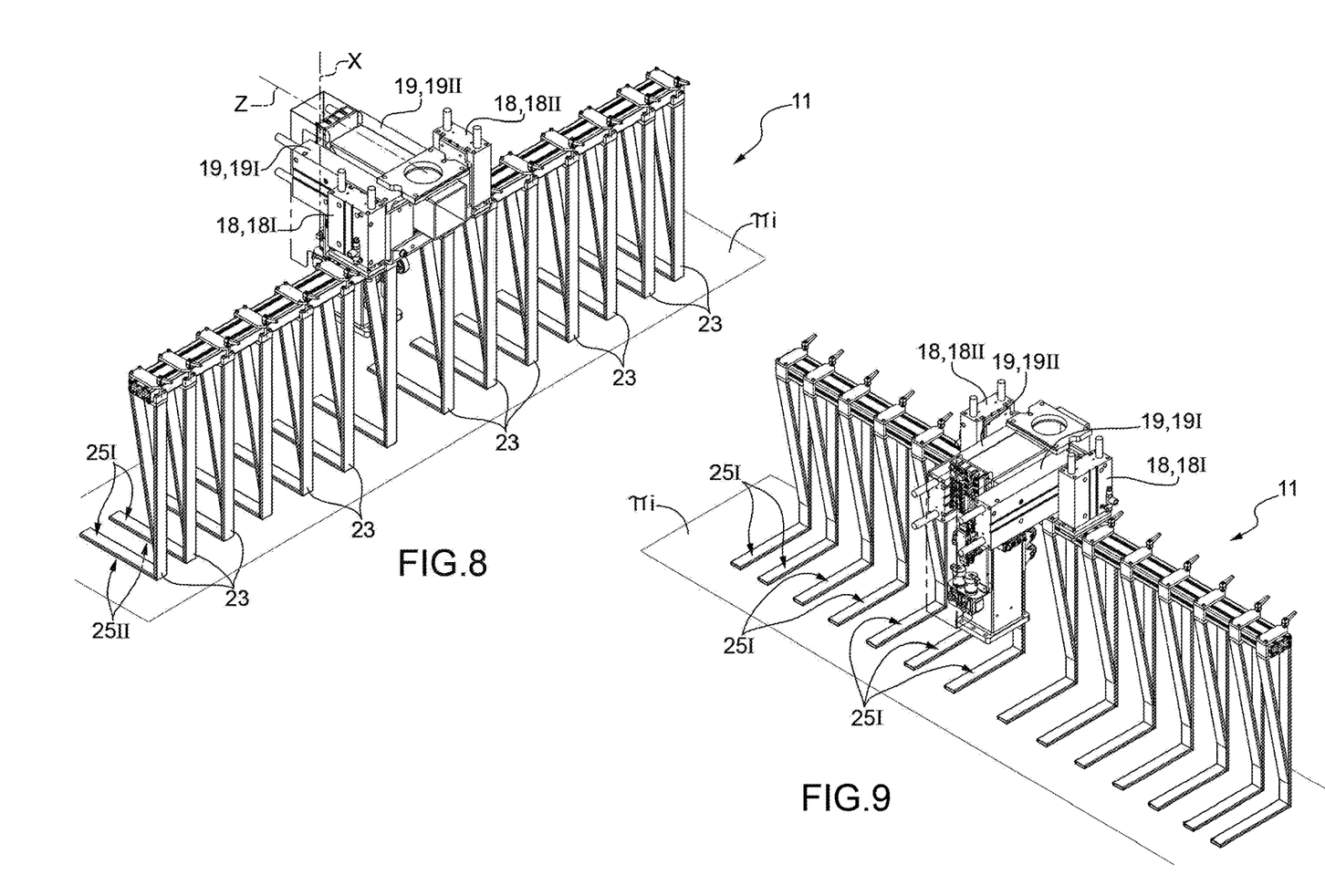
FIGS. 8 and 9 are perspective views having respective different angles of a further detail of a gripping system according to the present invention.

As illustrated in FIGS. 8 and 9, the support system 11 is configured to be selectively moved with respect to the electromagnetic system 10 from a rest position X1 (FIGS. 3, 4, 10, 11) to a grasping position X2 (FIGS. 13-17), and vice versa.

The support system 11 is comb-like comprising a plurality of tines 23, i.e. rods (or equivalent structural elements), side by side and parallel to each other. The support system 11 also comprises a connection structure 24 which supports all the tines 23 so that the latter lie substantially parallel to each other on an imaginary plane πi. The connection structure 24 is fixed to the drive assembly 16. Therefore, the drive assembly 16 can modify the relative position between the support 20 and the tines 23 through the connection structure 24.

According to the illustrated example, the connection structure 24 is of the comb-like type, the support system 10 having on the whole a structure similar to that of a rake.

The adjacent tines 23 are interspersed with each other by a respective space 26. The dimensions and the distribution both of the tines 23 and of the spaces 26 depend on the type of assembly table 7 with which the gripping system 9 has to cooperate.

According to the illustrated example, each tine 23 is a thin body, i.e. flattened, so as to have two relevant dimensions (width and length) and a reduced thickness (of a few millimeters). Each tine 23 has two lateral surfaces which are substantially flat and parallel to each other, identified in the following as upper 25I and, respectively, lower 25II. It is understood that the terms lower and upper are used with reference to the orientation of the gripping system 9 illustrated in FIG. 8. The lower lateral surface 25II of each tine 23 is coplanar with the imaginary plane πi.

The method for the production of sheet cores O according to the present invention is described in the following.

In use, the stacking unit 4 forms, in a known manner and not illustrated, a stack of sheets W above a respective loading plane 5. It should be noted that the method for the production of the cores O according to the present invention can also be applied for the transport of a single sheet P. In such case, the stack of sheets W is to be understood as formed by a single sheet P.

The stack of sheets W can be formed by sheets P having holes J. In case the stack of sheets W has holes J (generally the holes J are two and aligned with each other at predetermined distances), the stacking unit 4 forms the stack of sheets W so that the holes J of the sheets P are aligned in order to form corresponding slots H. Alternatively, the stack of sheets W can be formed by sheets P devoid of holes (such variant is not illustrated in the figures).

Before the grabbing of the stack of sheets W, the support system 11 is in (alternatively is brought to) the rest position X1, so that the electromagnetic system 10, in particular the support 20, can face directly and adhere to the stack of sheets W.

Then, the transport system 8 moves the gripping system 9 so as to arrange the support 20 of the electromagnetic system 10 above, and in contact with, the stack of sheets W. Preferably, the support 20 is aligned with a predefined imaginary line and referred to the positioning of the stack of sheets W on the loading plane 5 and/or to the arrangement of the slots H. The relative position between the stack of sheets W and the support 20 is known.

Figure 16:
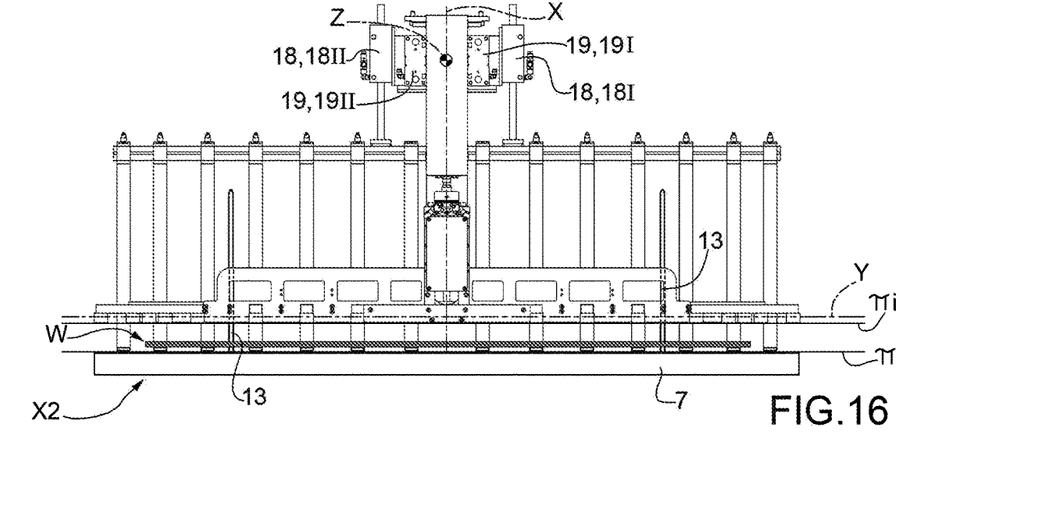
Figure 17:
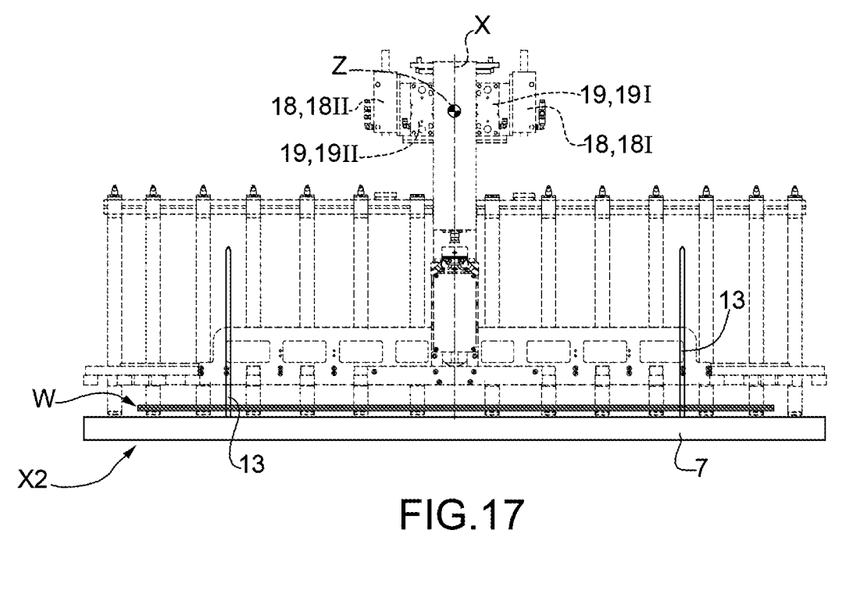
Figure 18:
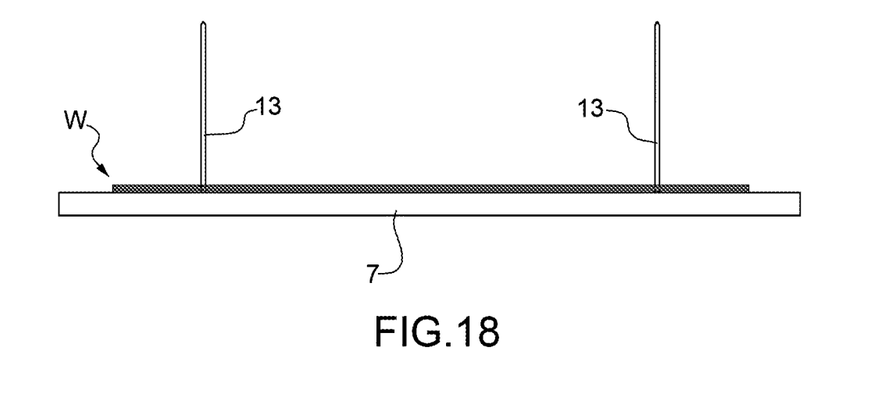

In case the stack of sheets W is provided with slots H, advantageously, the support 20 is positioned so that each slot H of the stack of sheets W is centred with (or falls inside of) a respective window 21 of the support 20. In this manner, advantageously, as will be better illustrated in the following, a pin 13 can be inserted through a respective slot H and a respective window 21 of the support 20 without finding obstacles (FIGS. 16 and 17).

When the support 20 is in contact with the stack of sheets W, the electromagnetic system 10 is activated, so as to produce an electromagnetic field E.

Advantageously, the electromagnets 22 of the support 20 are in contact with the stack of sheets 20. Advantageously, it is possible to select and adjust the activation of each electromagnet 22 of the electromagnetic system 10, depending on the type of stack of sheets W in contact with the support 20.

The electromagnetic system 10 produces an electromagnetic field E such to be suited to attract the stack of sheets W and make it adhere to one or more electromagnets 22.

In this regard, it is here recalled that a stack of sheets W according to the present invention can have significant dimensions and weights, which are approximately between 0.5 and 5 meters in length.

The adhesion of the stack of sheets W to the support 20 by magnetic attraction occurs almost instantly when the electromagnetic means 10 are activated.

Once the stack of sheets W adheres to the support 20 under the effect of the electromagnetic field E, the transport system 8 raises the gripping system 9 from the loading plane 5 (FIG. 12) and moves the gripping system 9 along a predefined trajectory t (FIG. 13) so as to move the stack of sheets W from the loading plane 5 to the assembly table 7.

Figure 13:
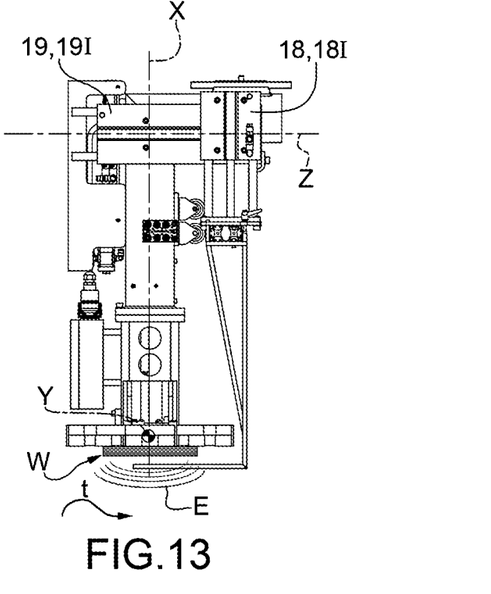
Figure 14:
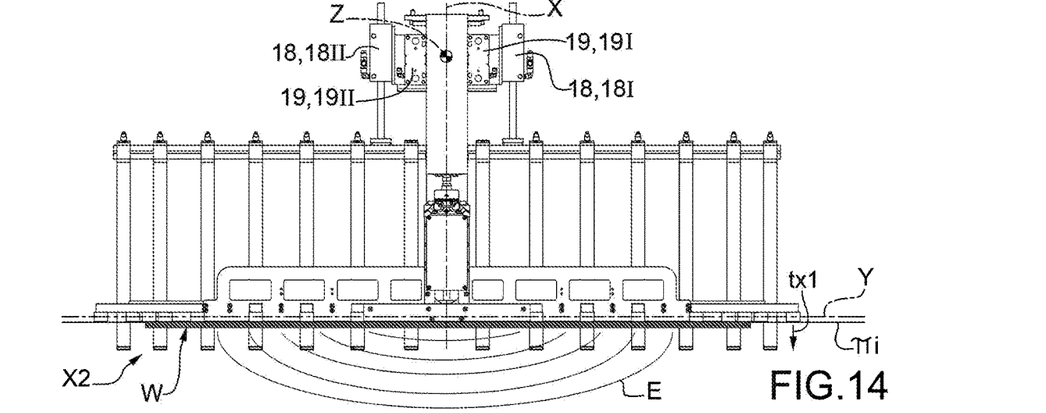

During the movement of the stack of sheets W by means of the gripping system 9, the drive assembly 16 changes the relative position between the support system 11 and the support 20, so that the support system 11 passes from the rest position X1 (FIG. 11) to the grasping position X2 (FIG. 13).

According to the illustrated example, the support system 11 is moved along the axis Z by the horizontal drive unit 19 (FIG. 12) and is moved along the axis X by the vertical drive unit 18. According to a variant not illustrated, the support 20 is moved with respect to the support system 11.

The change of the relative position between support 20 and support system 11 can take place during the run or during a stop of the gripping system 9.

In the grasping position X2, the tines 23 are positioned below the support 20 so as to be able to receive and support the stack of sheets W once placed by the electromagnetic system 10.

The gripping system 9 is positioned above the assembly table 7, depending on the stack of sheets W which it carries and so as to form a respective portion of the core O.

In case the stack of sheets W has slots H, the gripping system 9 is positioned so as to align each slot H with a respective pin 13. In particular, the gripping system 9 is positioned so that the imaginary plane πi whereon the tines 23 of the support system 11 lie is substantially aligned with the cusps of the pins 13.

Once the gripping system 9 is positioned above a respective position of the assembly table 7, the stack of sheets W is placed by the electromagnetic system 10 and falls in free fall along a path tx1.

Advantageously, in order to be able to place the stack of sheets W onto the assembly table 7, the electromagnetic system 10 is disconnected so as to allow the free fall of the stack of sheets W. Once the electromagnetic system 10 is disconnected, the stack of sheets W falls by effect of the force of gravity g onto the tines 23 of the support system 11. Advantageously, the fact that the sheets P of the stack of sheets W fall in free fall along a path tx1 (according to the example illustrated the distance along the axis X between the support 20 and the imaginary plane πi), in particular at the tip (i.e. initial path) of the pins 13, allows compensating for small alignment errors and ensures that the pins 13 pass through all the sheets P of the stack of sheets W without jams or forming creases on the sheets P. The path along which the stack of sheets W can fall in free fall is variable and depends on the dimensions of the sheets P.

Free fall means the movement caused by the force of gravity on an unconstrained body.

Figure 15:
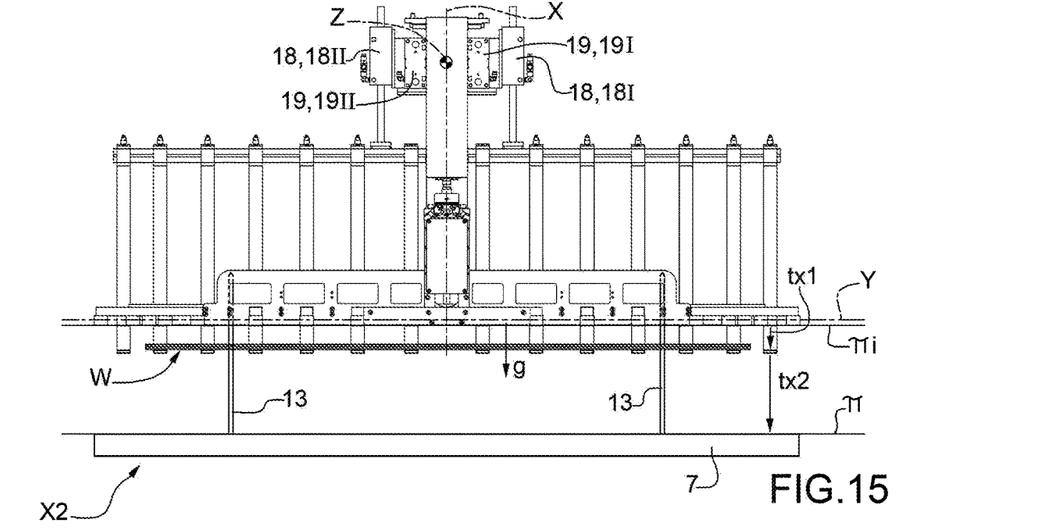

Then, the gripping system 9 is operated along a linear trajectory tx2, substantially parallel to the pins 13 (in particular it descends vertically, as illustrated in FIG. 15) up to bringing the tines 23 above the assembly table 7 (FIG. 16) without generating a contact.

During the movement along the linear trajectory tx2, the gripping system 9 can vibrate and/or make small alternative movements in any direction and/or make sussultatory movements. In this manner, advantageously, the sheets P of the stack of sheets W are prevented from adhering to/getting stuck with the pins 13.

Once arrived above the assembly table 7, the support system 11 is moved so as to place the stack of sheets W. Advantageously, the stack of sheets W is placed by fall (for a short path substantially slightly greater, by a few millimeters, than the thickness of the tines themselves) onto the assembly table 7.

The same operations are repeated with different stacks of sheets W and in different positions of the assembly table 7 up to the production of the core O.

In case the sheets P of the stack of sheets W are devoid of holes J, the gripping system 9 activates only the electromagnetic system 10 so as to grab, move and place the stack of sheets W.

Advantageously, the method and the gripping system of the type described above allow automatically transporting stacks of sheets W also of considerable dimensions and producing them on an assembly table 7 preventing deformation or jamming problems from arising when the stack of sheets W is passed through by respective pins 13 of an assembly table 7.

Advantageously, the method and the gripping system 9 of the type described above allow automatically transporting stacks of sheets W also of considerable dimensions and producing them correctly on an assembly table 7, also in case the slots H are not aligned with the centre of gravity of the stack of sheets W.

In fact, in this case, the method and the gripping system 9 of the type described above prevent the sheets P from getting stuck in the pins 13 of the assembly table 7.

Advantageously, the gripping system 9 of the type described above can also be used to transport stacks of sheets W devoid of slots H, in this case only the electromagnetic system 10 is activated. Therefore, the gripping system 9 ensures the maximum adaptability and the possibility of transporting a large variety of stacks of sheets W different from each other by type (having slots H or devoid of slots H) and dimension.

The invention claimed is:

1. A method for a production of stacked sheet cores for transformers by means of stacks of sheets; the method comprising the steps of:
   providing a stack of sheets comprising one or more sheets made of grain oriented electrical steel;
   grabbing said stack of sheets by a gripping system; and
   placing the stack of sheets on an assembly table,
   wherein during the step of placing, the stack of sheets falls in free fall along a path;
   wherein the gripping system comprises electromagnetic elements configured to selectively produce an electromagnetic field suited to attract, in use, the stack of sheets and support elements configured to support the stack of sheets; wherein, during the step of grabbing, the electromagnetic elements are activated to attract the stack of sheets; and
   wherein, during the step of placing, the support elements are interposed between the stack of sheets and the assembly table; wherein the step of placing comprises to disconnect the electromagnetic elements so that the stack of sheets falls in free fall onto said support elements.

2. The method according to claim 1, wherein the assembly table is horizontal, namely parallel to a support plane, and comprises one or more pins, each of which protrudes perpendicularly to said assembly table; wherein the support elements are comb-like comprising two or more tines; the support elements having a space between two adjacent tines; wherein, during the step of placing, the support elements slide vertically along said one or more pins.

3. The method according to claim 2 wherein, during the step of placing, the support elements vibrate in one or more directions and/or make sussultatory movements.

4. A gripping system for the production of stacked sheet cores for transformers by means of stacks of sheets comprising one or more sheets made of grain oriented electrical steel; the gripping system comprising electromagnetic elements configured to selectively produce an electromagnetic field suited to attract and/or place, in use, a stack of sheets; and
   comprising support elements,
   wherein the support elements are comb-like comprising two or more tines;
   wherein said electromagnetic elements and said support elements are reciprocally movable from a rest position to a grasping position, and vice versa; and
   wherein said two or more tines are configured so that, in the grasping position, they are interposed between said electromagnetic elements and an assembly table.

5. The gripping system according to claim 4, wherein the electromagnetic elements are configured so that, in the rest position, they are directly in contact with the stack of sheets.

6. A plant for the production of stacked sheet cores for transformers; the plant comprising a feeding unit configured to provide a stack of sheets comprising one or more sheets; the plant comprising a gripping system comprising the one or more sheets made of grain oriented electrical steel and electromagnetic elements configured to selectively produce an electromagnetic field-suited to attract and/or place, in use, the stack of sheets, and configured to perform a method according to claim 1.

* * * * *